Figure 1:
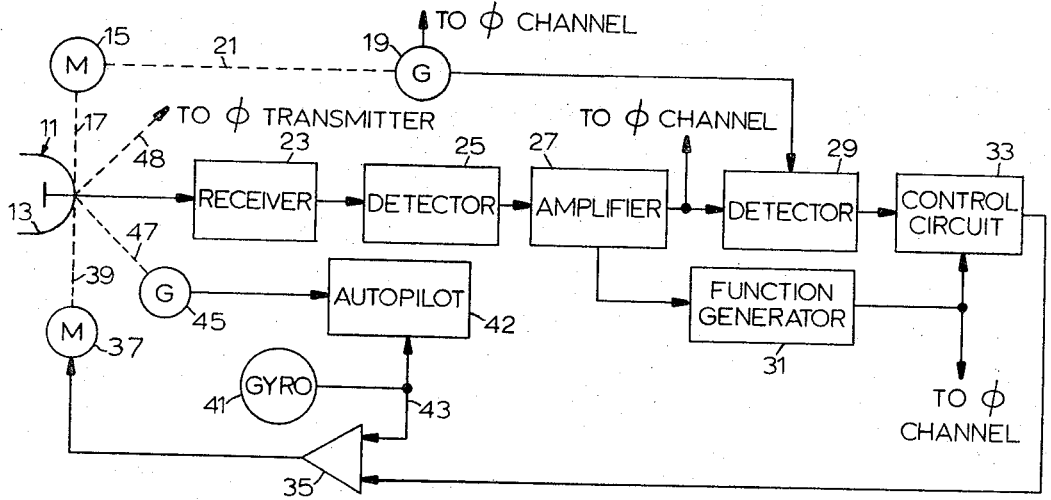

May 23, 1967 F. BIAGI ETAL 3,321,761
ADAPTIVE TARGET SEEKING SYSTEM
Filed Dec. 28, 1964

FERNANDO BIAGI
MICHAEL W. McKAY
INVENTORS

United States Patent Office 3,321,761
Patented May 23, 1967

3,321,761
ADAPTIVE TARGET SEEKING SYSTEM
Fernando Biagi, Wayne, N.J., and Michael W. McKay, Tarrytown, N.Y., assignors to General Precision Inc., Little Falls, N.Y., a corporation of Delaware
Filed Dec. 28, 1964, Ser. No. 421,368
1 Claim. (Cl. 343—117)

This invention relates generally to an object locating and tracking system, and more particularly to a target seeking system which adapts itself to provide increased tracking when closing in on a target.

Various target seeking systems have been developed to track a target, either stationary or moving, while advancing toward the target. Some of the systems use a sensor which receives electromagnetic energy that is the echo reflected from a target to which the energy was initially transmitted. Such systems can be considered as active target seeking systems.

Other types of target seeking systems rely on light reflection from a target to distinguish it from its background, heat radiation emanating from the target, or a distinct temperature contrast of the target against its background. Such systems are normally considered passive detection and seeking systems, and although not specifically restricted thereto, the present invention relates to this latter type of system.

The detectability of vehicular targets by a passive microwave target seeking system has various advantages over other systems. Among the advantages are dependability of target signature from metallic targets, penetration of smoke, camouflage and light foliage, and a relatively all-weather capability. When a missile incorporating a passive tracker as a terminal guidance seeker is used, the above advantages make for a more dependable and accurate weapon.

Typical targets which are normally detected and tracked are usually metallic structures or vehicles that represent a distinct contrast, temperature-wise, when viewed against their normal terrain environment as a background. In other words, a target can be viewed as a region of significant temperature discontinuity. This region is roughly the physical area of the metallic target, and it can be seen that targets appear as point sources when viewed by means of microwave antennas of moderate beam width and at ranges of hundreds of meters.

The temperature sensitivity of the tracker usually sets a limit to its detection range. The maximum useful temperature sensitivity is determined by fluctuations in temperature due to the variable background within the tracker field of view. Various factors which improve temperature sensitivity are low receiver noise figure, a high pre-detection band width, or a large post-detection time constant.

The receiver sensitivities are usually predicated on a fixed post-detection time constant. The range at which a given target can be detected varies as the fourth root of this post-detection time constant. To achieve a maximum range while still keeping a missile quite maneuverable is a problem to which the subject invention is directed.

The basic approach to this problem is to cause the time constant of the missile to adapt itself to provide an information rate which is matched to the needs of the missile control system. A large time constant can be used when a target is first detected since steering information can be less frequent when the missile is far from target. After acquisition and movement toward the target, the time constant is reduced, thus providing maximum maneuverability during the terminal phase of guidance. Therefore, a very high increase of detection range will be accomplished without sacrificing the accuracy requirements of the missile.

In the prior art systems where increased tracking range is accomplished, an increased signal to noise ratio is usually provided. Assuming constant receiver noise figures, in active systems an increased in power and aperture provides longer range capabilities, while in passive systems an increase of band width and aperture supplies the same results. However, these solutions involve equipment penalties in weight and power. Further, additional complexity and sophistication of circuitry for wide band-width passive systems is necessary.

In the system of the present invention, a means for varying the time constant of a target seeking system is provided. Such means can comprise an integrator, or a filter element with a variable cut-off frequency, or the like.

Accordingly, an object of the present invention is to provide a target seeking system having increased tracking capabilities.

Another object of this invention is to provide a missile tracking system which lowers the requirement on initial missile maneuvering characteristics.

A further object of this invention is the provision of a target seeker having a compressed dynamic range of error sensitivity which decreases the gain margin required in the gimballed servo-loops of the complete system.

Still another object of this invention is to improve the detectability of vehicular targets utilizing passive millimeter wave radiometry.

A still further object of this invention is to provide a variable post-detection time constant for a missile which adapts itself to provide an information rate that is matched to the needs of the missile control system.

Still another object of this invention is the provision of means in a target seeking and control system for providing an initially large time constant that is reduced after target acquisition to a small value at the terminal phase of guidance.

A still further object of this invention is to provide adaptive control of seeker response time to extend missile range and simultaneously compress the error sensitivity range.

A still further object of this invention is to provide a circuit which affords a time constant variation in a target seeking system.

Figure 2:
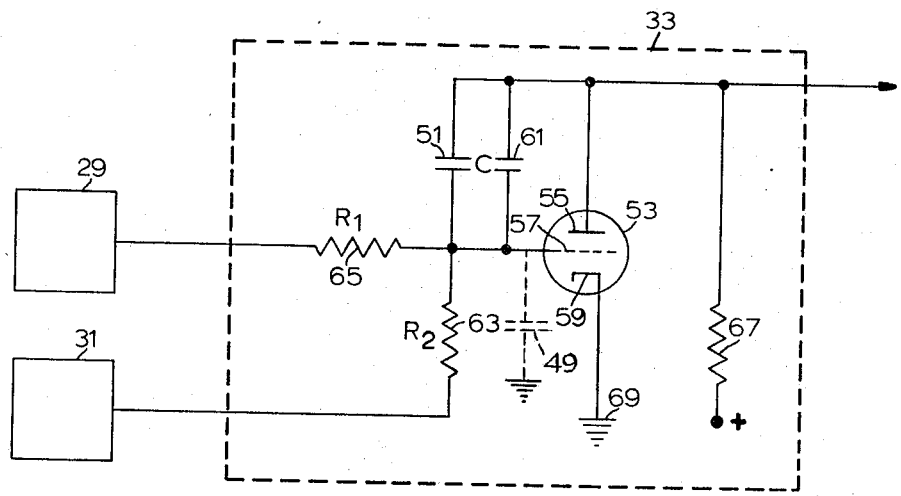

Further objects and advantages of the present invention will become readily apparent as the following detailed description of the invention unfolds and when taken in conjunction with the accompanying drawings, wherein:

FIG. 1 is a block diagram of the target seeking system of the present invention; and FIG. 2 is a detailed circuit diagram of a portion of the system depicted in FIG. 1.

Before proceeding into the description of an embodiment of the subject invention, a brief summary of target seeking missiles in general will be made. For the successful operation of a target seeking missile, several basic elements should be kept in mind. These elements include a target from which energy, either original or reflected, is received by the missile. From the missile receiver, line of sight errors are presented to an inertially stabilized sensor, the outputs of which consist of the apparent angles of the target. These outputs are fed to the vehicle control system, which in turn causes missile movement toward the target, thus reducing line of sight errors to the required miss-distance values. Of course, the necessary missile propulsion is provided and can be controlled by the vehicle control system to supply the necessary target closing velocity.

In all target seeking missiles the vehicle control system performance may be described in terms of a time constant. This time constant is dictated by the accuracy desired of the missile with regard to the target. In other words, the required miss-distance of the missile determines the time constant for its performance.

Needless to say, the time constant is quite small during the terminal phase of the missile's flight, but need not be such during the initial phase of flight. Quick maneuvering is not necessary when the missile is distant from the target, while increased gain in the system is important during this early stage. The reason for the desirability of increased gain is that the target signals are much weaker at long distances. This invention optimizes seeker tracking by a missile by adjusting the missile time constant from a maximum value down to the value required for the necessary miss-distance, while at the same time providing increased gain during the initial phase of flight, the gain also being reduced as the missile approaches the target and the target signals get stronger.

Referring now to FIG. 1, there is shown a block diagram of the target seeker of the present invention. The target seeker is, perhaps, best described as a sensor which combines a microwave radiometer with well-known conical scanning techniques. The target sources can be located, in terms of the direction of the arrival of the signal, by well-known lobing techniques employed on the receiving antenna system.

In FIG. 1 there is shown a parabolic antenna 11 having an angular offset reflector 13 which is rotated mechanically by a motor 15 through a mechanical drive depicted by the dashed line 17. The reflector 13 is rotated at a beam lobing rate $f_s$. A tachometer generator 19 is mechanically connected to the motor 15 through a connection shown by the dashed line 21. The generator 19 develops an electrical signal with a frequency equal to the lobing rate. This signal is used as a phase reference for determining target direction.

It should be mentioned that the description of the present embodiment involves only one of the two channels which form the entire target seeking system. For instance, in FIG. 1 the $\theta$, or azimuth channel is shown. The $\varphi$, or elevation channel contains identical components except for the fact that the output from the generator 19 is displaced 90° in time phase from that of the $\theta$ output. The required phase relationship can be achieved quite easily, as, for instance, by a separate winding appropriately placed on the generator frame.

A receiver 23 is connected to the antenna 11 which can be a typical microwave receiver having a pre-detection band width B, a noise figure F and a gain G. The receiver 23 may be either a superheterodyne or a T.R.F. type. For normal operation the band width B can be at least 50 megacycles with a noise figure of 10 db and a gain of 90 db. These figures will provide usable temperature sensitivity.

After the target signal is received by the receiver 23, it is passed to an envelope detector 25, which can be a conventional crystal diode. The output of the envelope detector 25 will contain direction components at the beam scan frequency $f_s$, if the target is within the detection range and the received signal exceeds the temperature threshold sensitivity of the system. The temperature threshold sensitivity is determined by the noise figure and band width of the receiver 23. If an antenna pointing signal exists indicating the reception of a target signal, this signal is detected and amplified by a scan rate amplifier 27. The amplifier 27 is a conventional band pass amplifier centered at a frequency determined by $f_s$ and of sufficient width to accommodate any drift in the beam lobe rate. In one experimental system $f_s$ was 35 c.p.s.

The amplified target signal output is then passed from the scan rate amplifier 27 to a phase detector 29 and to the $\varphi$ channel. The phase detector 29 compares the target signal detected with the lobing rate signal from the tachometer generator 19 to produce a D.C. error signal at its output. The magnitude of this signal is proportional to the line of sight error in the $\theta$ plane containing the target and antenna. Normally, this signal would then be passed to a servo-amplifier which in turn would act to re-align the antenna to reduce the error signal to zero.

The output of the scan rate amplifier 27 is also fed to a control function generator 31. The function generator 31 is actuated by a threshold signal-to-noise ratio prevailing at the scan rate amplifier 27. For instance, when the signal-to-noise ratio at the output of the amplifier 27 exceeds the pre-set threshold, the function generator 31 is activated to generate an RC discharge at its output. Various known circuits can be utilized to perform this function. As an example, this circuit may include a thyratron tube having its grid coupled to the output of amplifier 27, a capacitor and resistor in series with the anode-cathode circuit of the tube. Output of the circuit may be taken at the junction of thyratron anode and such resistor. In response to an output of the amplifier 27 in excess of a threshold valve above which the thyratron fires, the thyratron conducts, discharging the capacitor through the tyratron tube and series resistor.

The control function generator 31 can be arranged so as to provide an optimum change in time constant per unit of time based on the anticipated changes in signal-to-noise ratio when the missile closes in on a target. Although the control function generator 31 is shown as being actuated by the scan rate amplifier 27, it should be mentioned that other commands, external or internal, could be used.

The output of the control function generator 31 and the output of the phase detector 29 are passed to a variable time constant control circuit depicted by the block 33. The output of the control function generator 31 is also passed to the $\varphi$ channel. The circuit for providing the variable time constant will be described in more detail as this description proceeds. The output of the block 33 is then fed to a servo-amplifier 35 for reducing the original line of sight error signal toward zero.

Returning briefly to the antenna 11, it should be mentioned that the antenna assembly is gimballed in both the $\theta$ and $\varphi$ direction. In the $\theta$ direction, for example, the degree of freedom of the antenna position is controlled through a drive motor 37 actuated by the servo-amplifier 35. The drive motor 37 in turn aligns the antenna 11 in the azimuth direction through means of a mechanical connection shown by the dashed line 39.

A precision rate gyro 41 is mounted on the $\theta$ gimbal to provide an azimuth rate output to the autopilot 42 of the missile. The gyro 41 also isolates the antenna 11 from missile body motions about the $\theta$ axis. This latter feature is accomplished by feedback into the servo-amplifier 35 by means of the line 43. Any well-known precision rate gyro means can be utilized to perform these functions.

Finally, a synchro-controlled transmitter 45 is connected to the gimballed antenna 11 by means of a mechanical connection shown by the dashed line 47. The synchro-control transmitter 45 provides a signal of the $\theta$ position to the autopilot 42, should this be needed. The dashed line 48 indicates a mechanical connection to a transmitter for providing a $\varphi$ signal.

In operation, the motor 15 rotates the angular offset reflector 13 at the lobing rate frequency $f_s$. When a target comes within range, the signal is picked up by the antenna 11 and is passed through the receiver 23 to be detected by the envelope detector 25. The target signal is then amplified by the scan rate amplifier 27 and compared at the phase detector 29 with the lobing rate frequency signal from the tachometer generator 19. The output of the phase detector 29 is then passed through the block 33 to the servo-amplifier 35. The signal from the servo-amplifier 35 operates the motor 37 to decrease the line of sight error in the θ plane containing the target and antenna.

The same operation is being performed in the φ or elevation plane and a similar error signal reduction is performed in the φ plane to keep the missile in line with the target by operating the necessary missile deflection components.

As mentioned previously, the entire closed loop response time determines the tracking accuracy. The time constant of the entire closed loop determines the miss-distance of the missile with regard to the target. As can be understood, a large time constant and gain during the early stages of target tracking is desirable because maneuvering requirements are not very demanding and the target signal is weak. However, as the missile approaches the target a very small time constant and gain is desired to allow the missile to maneuver as quickly as possible to stay within the required miss-distance and the target signal is stronger.

Referring now to FIG. 2, there is shown within the dashed lines of the block 33 a circuit configuration for providing a variable time constant and gain which is controlled by the voltage output of the control function generator 31.

The circuit depicted in FIG. 2 relies to a certain extent on the Miller effect and for that reason can be considered as a Miller integrator.

As integrator of the type mentioned is based on the variation of the input capacitance, $C_{in}$, of a triode amplifier tube. The relation can be stated as follows:

(1) $$C_{in} = C_{gk} + C_{gp}(1+A)$$

where, $C_{gk}$ is the grid-cathode capacitance;
$C_{gp}$ is the grid-plate capacitance; and
$A$ is the gain of the triode.

This relation may be found in any standard text. The above equation simply points out that an increase of input capacitance can be accomplished by increasing the second term of the equation, namely, the product of tube gain times $C_{gp}$.

In the circuit illustrated by FIG. 2, a triode tube 53 has shown therein a grid-cathode capacitance 49 and a grid-plate capacitance 51. The plate, grid, and cathode of the tube 53 are designated by reference numerals 55, 57 and 59, respectively. An external capacitor 61 is placed in parallel with capacitance 51 between the plate 55 and the grid 57. The value of the capacitor 61 is made substantially larger than that of capacitance 51, depending on the decided time constant. A typical value of the capacitor 61 would be $10^6$ times that of the capacitance 51.

The remainder of the circuit illustrated in FIG. 2 includes a resistor 63 connected between the output of the control function generator 31 and the grid 57 of the tube 53, a second resistor 65 connected between the output of the phase detector 29 and the grid 57, and a third resistor 67 connected between the plate 55 of the tube 53 and a source of positive voltage. The cathode 59 of the tube 53 is connected directly to ground 69. The output of the circuit is taken from a point between the plate 55 and the resistor 67.

The gain of a triode is well known to be a function of a negative control voltage applied to the grid of the tube. In FIG. 2, this control would be accomplished by voltage applied to the resistor 63. The resistor 65, on the other hand, is included to provide a resistance ratio in determining the final time constant of the circuit.

Referring now to the operation of the circuit, as seen from the output of the phase detector 29, the error signal passes through a time constant whose value is:

(2) $$\tau = \frac{R_1 R_2}{R_1 + R_2}[C_{gk} + (C_{gp}+c)(1+A)]$$

since C is $\gg C_{gp}$ or $C_{gk}$ this may be approximated as:

(3) $$\tau \approx \frac{R_2 R_1}{R_1 + R_2}(C)(A)$$

Thus, there is accomplished a means of realizing a variable time constant, for, as noted above, the gain of the tube 53 is related to the control function voltage that biases the operating point of the tube through the resistor 63. Where the control voltage is only slightly negative, the highest gain of the tube 53 results. This yields, in turn, the greatest value of time constant. As the control voltage of the function generator 31 is made more negative, the gain of the triode 53 is decreased, thereby reducing the value of the time constant.

The circuit shown in FIG. 2 can be thought of as being a low pass filter element whose cut-off frequency, as measured from a D.C. axis, is variable and controlled by the function generator 31. The filtered error signal at the output of the circuit is then used as the θ servo input signal which causes the antenna boresight to be driven to the target line of sight.

Referring briefly to the control function generator 31, this generator provides the necessary voltage changes required to alter the time constant of the circuit of the block 33. The activation of the time constant change can be controlled through the function generator by signal indications in the scan rate amplifier 27 or by preset or timed independent means.

In conclusion, it can be seen that there is provided in the present invention a means to adapt a target seeking missile system for long ranges with minimum control while keeping the missile within required miss-distances during the terminal portion of the missile flight. Such is accomplshed in a simple manner by varying the time constant of the closed-loop response of the servo system in the missile. The time constant change is accomplished by simple means which do not create weight or complexity problems for an already complex system.

With the range optimization by adapted seeker technique of the subject invention, passive radiometric seekers for tactical missiles have been increased in their usefulness and potential. Longer ranges with as accurate terminal accuracy have been provided without a sacrifice of weight or simplicity.

The above description is of a preferred embodiment of the invention, and many modifications may be made thereto without departing from the spirit and scope of the invention, which is defined in the appended claim.

What is claimed is:

In a passive target detecting and seeking system for use with a missile including a gimballed rotating antenna having an axis adapted to be aimed at the target, means for rotating said antenna, means connected to said antenna rotating means for generating a reference voltage wave, motor means for shifting the axis of said antenna, means including said antenna for forming a voltage wave having a target signal component therein, means for detecting said target signal from said voltage wave to provide a modified voltage wave, means for amplifying said modified wave, means for comparing the phase of said modified wave and said reference wave to produce an error signal voltage having an amplitude and direction which varies with the error in pointing said antenna toward the target, means for integrating said error signal voltage and control means responsive to said amplifying means for varying the gain and integration of said error signal voltage integrating means, and means for utilizing said integrated error signal voltage to drive said motor means to shift the position of the axis of said antenna in such a direction as to reduce the error to substantially zero, the improvement in said system wherein said means for integrating said error signal voltage includes a triode having the grid connected to said comparing means and said control means, and a capacitor connected between the plate and grid of said triode.

References Cited by the Examiner

UNITED STATES PATENTS

| | | | |
|---|---|---|---|
| 2,698,932 | 1/1955 | Walthen | 343—7.4 |
| 2,704,815 | 3/1955 | Guiles | 343—117 X |
| 2,784,402 | 3/1957 | White et al. | 343—7.4 X |
| 2,964,265 | 12/1960 | Ketchledge | 343—117.1 X |
| 2,999,238 | 9/1961 | George | 343—107 |
| 3,041,607 | 6/1962 | Rhodes et al. | 343—107 |
| 3,098,228 | 7/1963 | Medlinski et al. | 343—107 |
| 3,206,753 | 9/1965 | McCoy | 343—7.4 X |

OTHER REFERENCES

Terman: Electronic and Radio Engineering, 4th Edition, TK6550 T 4 195.5 c.g., pages 652–655, 194–195.

RODNEY D. BENNETT, *Primary Examiner.*

CHESTER L. JUSTUS, *Examiner.*

C. E. WANDS, *Assistant Examiner.*